(12) United States Patent
Arumugam

(10) Patent No.: US 10,715,343 B1
(45) Date of Patent: Jul. 14, 2020

(54) DEVICE MONITORING FOR CONFERENCE RESERVATION CANCELLATION

(71) Applicant: Amazon Technologies, Inc., Seattle, WA (US)

(72) Inventor: Sivakumar Arumugam, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 82 days.

(21) Appl. No.: 15/697,347

(22) Filed: Sep. 6, 2017

(51) Int. Cl.
H04M 3/42 (2006.01)
H04L 12/18 (2006.01)
H04L 29/06 (2006.01)
H04N 7/15 (2006.01)

(52) U.S. Cl.
CPC ...... *H04L 12/1827* (2013.01); *H04L 65/4038* (2013.01); *H04N 7/15* (2013.01)

(58) Field of Classification Search
CPC .... H04L 12/1827; H04L 65/4038; H04N 7/15
USPC ............................................. 379/202.01, 158
See application file for complete search history.

(56) References Cited

U.S. PATENT DOCUMENTS

| 5,764,278 | A | 6/1998 | Nagao | |
|---|---|---|---|---|
| 7,818,198 | B2 | 10/2010 | Masselle et al. | |
| 7,852,993 | B2 * | 12/2010 | Ju | H04M 3/42042 379/88.02 |
| 8,743,171 | B2 | 6/2014 | Hiller et al. | |
| 8,768,308 | B2 | 7/2014 | Kim et al. | |
| 9,877,266 | B1 * | 1/2018 | Knas | H04W 40/244 |
| 2003/0005055 | A1 * | 1/2003 | Ralston | G06F 19/3418 709/204 |
| 2007/0038761 | A1 * | 2/2007 | Tebeka | G01S 5/0252 709/228 |
| 2010/0185933 | A1 * | 7/2010 | Coffman | G06Q 10/10 715/230 |
| 2012/0327175 | A1 * | 12/2012 | Couse | H04L 12/1818 348/14.08 |
| 2013/0127979 | A1 * | 5/2013 | Koh | H04M 3/567 348/14.08 |

(Continued)

OTHER PUBLICATIONS

Grant Clauser, "What is Alexa? What is the Amazon Echo, and Should You Get One?", Retrieved from URL: http://thewirecutter.com/reviews/what-is-alexa-what-is-the-amazon-echo-and-should-you-get-one/ on Feb. 23, 2017, pp. 1-18.

*Primary Examiner* — William J Deane, Jr.
(74) *Attorney, Agent, or Firm* — Robert C. Kowert; Kowert, Hood, Munyon, Rankin & Goetzel, P.C.

(57) ABSTRACT

Methods, systems, and computer-readable media for device monitoring for conference reservation cancellation are disclosed. A location value is associated with a reservation for a scheduled conference associated with a scheduled starting time and a scheduled ending time. A voice-capturing device is associated with the location value, and the voice-capturing device is configured to send voice input to a service provider environment over a network. Voice input is not received from the voice-capturing device within a duration of time between the scheduled starting time and the scheduled ending time. The reservation is canceled based on determining that the voice input is not received from the voice-capturing device within the duration of time between the scheduled starting time and the scheduled ending time.

20 Claims, 8 Drawing Sheets

(56) References Cited

U.S. PATENT DOCUMENTS

| | | | |
|---|---|---|---|
| 2013/0229929 A1* | 9/2013 | Linsky | H04W 8/18 |
| | | | 370/252 |
| 2017/0040018 A1 | 2/2017 | Tormey | |
| 2017/0155660 A1* | 6/2017 | Stuntebeck | H04L 63/0435 |
| 2017/0223064 A1* | 8/2017 | Le Devehat | H04L 65/1069 |
| 2017/0357917 A1* | 12/2017 | Holmes | G06Q 10/02 |
| 2018/0082264 A1* | 3/2018 | Szeto | G06Q 10/1095 |
| 2018/0121150 A1* | 5/2018 | Lin | H04W 4/043 |
| 2018/0164999 A1* | 6/2018 | Scott | G06F 3/04842 |
| 2018/0253666 A1* | 9/2018 | Fix | G06Q 10/02 |

\* cited by examiner

DEVICE MONITORING FOR CONFERENCE RESERVATION CANCELLATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Such services may be said to reside "in the cloud." The types of devices that can access cloud-based services continue to expand and diversify, including, for example, desktop computing devices, mobile devices such as smartphones and tablets, voice-capturing devices, home automation devices, and various other types of network-capable devices that are part of the "Internet of Things (IoT)." By accessing cloud-based services, a diverse universe of devices may access additional functionality or computing power not available locally on the devices.

Figure 1:
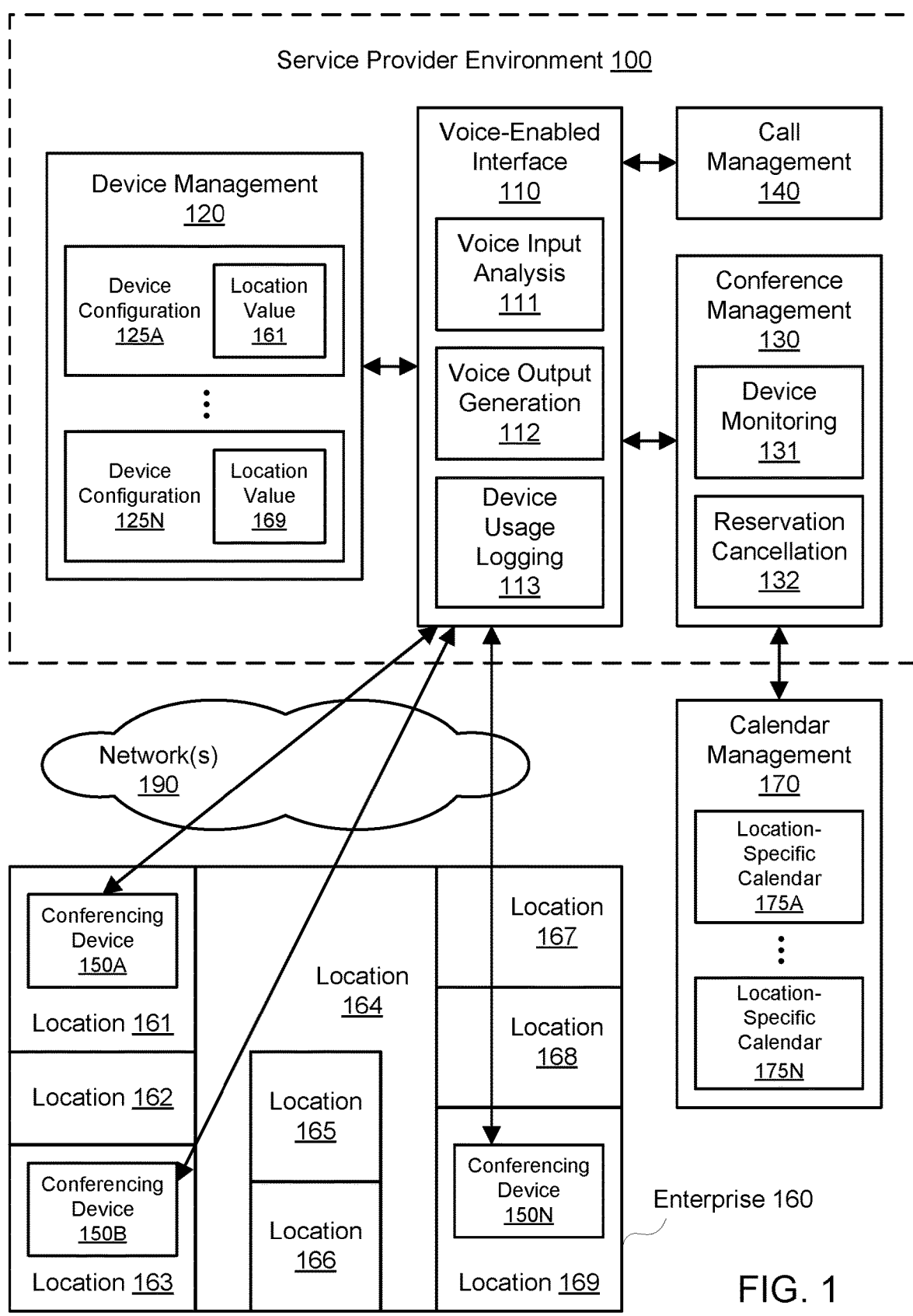
FIG. 1 illustrates an example system environment for device monitoring for conference reservation cancellation, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for device monitoring for conference reservation cancellation are described. An enterprise such as a business or other organization may deploy conferencing devices in various locations such as conference rooms. Suitable conferencing devices may include voice-capturing devices, or smart speakers, personal electronic devices (e.g., smartphones, tablet computers), personal computers, as well as other home automation and/or "Internet of Things" devices. The devices may be configurable to access one or more services provided by a cloud-based service provider environment, such as one or more network-accessible voice-based services that analyze and respond to voice input streamed from the devices. In the service provider environment, a device may be associated with a particular location in the enterprise, such as a particular room in a particular building on a particular site. One or more services in the service provider environment referred to as "skills" may perform actions, e.g., actions that are dependent on or associated with the location of the device and/or other device parameters. For example, a location may be reserved for a conference for a particular window of time, and the device in that location may be used to participate in the conference by sending captured audio to other participants via the service provider environment and receiving audio from other participants via the service provider environment. In one embodiment, during a scheduled conference, the service provider environment may monitor use or non-use of a conferencing device in a location reserved for the conference. If the device has not joined the conference within some period of time after the scheduled start of the conference, the reservation of the location for the conference may be automatically canceled. In one embodiment, the duration of the monitoring period may be configured, e.g., by an organizer of the conference. In one embodiment, after determining that the device has not provided voice input associated with the scheduled conference, the service provider environment may prompt a user of the device to join (e.g., using voice output such as "would you like to join the meeting?") and may cancel the reservation if a suitable user response is not received. After the original reservation is canceled, the same location may be reserved for another conference during the window of time of the original reservation. Using these techniques for canceling conference reservations, locations within an enterprise may be used for conferencing in a more efficient manner.

FIG. 1 illustrates an example system environment for device monitoring for conference reservation cancellation, according to one embodiment. A set of conferencing devices such as devices 150A and 150B through 150N may interact with one or more components of a service provider environment 100, e.g., to access additional functionality or computing resources not available locally on the devices but instead provided (at least in part) by the service provider environment. The service provider environment 100 may provide functionality or computing resources to various types of devices outside the service provider environment, such as various types of electronic devices, digital devices, and/or computing devices. For example, any of the devices 150A-150N may represent a conferencing device, a smart speaker, a smart television or other audiovisual component, a home automation device, and/or another type of device in the "Internet of Things (IoT)." The devices 150A-150N may be referred to herein as voice-capturing devices or voice-capturing endpoints and may include a voice interaction capability. In one embodiment, the devices 150A-150N may include a voice input capture component, such as one or more microphones and/or other suitable voice-capturing or audio input component(s), usable to capture audio input including speech. In one embodiment, the devices 150A-150N may include a voice output component, such as one or more speakers and/or other suitable audio output component(s), usable to play back audio output including speech. Using the techniques described herein, monitoring of the presence or absence of audio input from the devices 150A-150N may be used for conference reservation cancellation.

The devices 150A-150N may be authorized to access one or more resources and/or services provided by the cloud-based service provider environment 100. The service provider environment 100 may include various components that are owned or managed by one or more entities or organizations called service providers. In various embodiments, aspects of the service provider environment 100 may be provided as one or more publicly accessible services that are "in the cloud" relative to the devices 150A-150N or instead as one or more privately accessible services. The components of the service provider environment 100 may be located in one or more data centers and in one or more geographical locations. The service provider environment 100 may include and/or offer a plurality of services, and the services may perform various functions or operations. In various embodiments, some of the services may be accessed by the devices 150A-150N while others of the services may be accessed only by other services and not directly by the device. The services may be implemented according to a service-oriented architecture (SOA) in which services exchange requests and responses to perform complex operations. In various embodiments, the services may include a network-accessible, voice-enabled interface 110; a device management functionality 120, a conference management functionality 130; a call management functionality 130; and/or various other services.

The devices 150A-150N may stream or otherwise send voice input to the voice-enabled interface 110. The voice-enabled interface 110 may be part of a voice interaction platform hosted in a cloud computing environment. Using a voice input analysis component 111, the voice-enabled interface 110 may analyze the voice input from one of the devices 150A-150N and take one or more actions responsive to the voice input, such as initiating one or more tasks on behalf of the originating device. Using a voice output generation component 112, the voice-enabled interface 110 may generate and send voice output (e.g., synthetic or computer-generated output) back to the originating device for playback on the device. The actions and/or voice output may vary based on the resources and/or services of the service provider environment 100, also referred to herein as skills, that are accessible to the particular device. In various embodiments, the skills provided by the service provider environment 100 may include, for example, scheduling conference calls; identifying a speaker during a conference call; acting as a scheduling assistant; providing calendaring services, recording a meeting; accessing calendars, phone directories, or e-mail; creating, scheduling, and/or modifying tasks; ordering items or food; requesting assistance, such as room service or a taxi; and so on. In one embodiment, the particular skills accessible to a device may vary and may be modified by an administrator or other user with suitable configuration privileges. The voice-enabled interface 110 may use a device usage logging functionality 113 to store a log of interactions between the devices 150A-150N and the service provider environment 100. For example, each utterance sent by a particular device and analyzed by the voice input analysis 111 may be recorded in a log for the device, along with a timestamp. As another example, each instance of voice output sent to a device may be recorded in a log for the device, along with a timestamp.

In one embodiment, the service provider environment 100 may include a device management service or functionality 120 that is usable to determine or modify aspects of device configurations associated with the devices 150A-150N. For example, the device management 120 may maintain a device-specific configuration 125A corresponding to the device 150A, a device-specific configuration 125N corresponding to the device 150N, and so on. In one embodiment, the device management 120 may be provided by a service targeted to device management for businesses, educational institutions, and/or residences. In one embodiment, the device management service 120 may be used to make particular skills accessible to a device, e.g., based on user input or input through an application programming interface (API). For example, user input to the device management service 120 may identify a set of skills that a particular device or class of devices can access, e.g., as selected from a predetermined list of skills provided by the service provider environment 100. The device configuration for a device may include or be associated with a device identifier, such as a serial number of the device. A device configuration may also include additional parameters and their corresponding values. A device configuration may indicate a set of one or more services called "skills" that are accessible to the device in the service provider environment 100.

In one embodiment, the device management service 120 may be used to specify authorized or permissible values for device configuration parameters, e.g., based on user input or input through an API. For example, the authorized values for a location parameter may include a set of named locations 161-169, such as rooms within one or more buildings and/or sites associated with an enterprise 160, as provided by a client of the service provider environment 100. The enterprise 160 may represent a business or other organization that owns, leases, and/or operates the conferencing devices 150A-150N. One of the locations 161-169 may represent a particular room in a building or on a campus that includes multiple rooms. As another example, one of the locations 161-169 may represent a particular conference room, office, or other space within a particular office building. As a further example, one of the locations 161-169 may represent a particular room or area within a particular residence. As yet another example, one of the locations 161-169 may represent a particular hotel room within a particular hotel. The location values associated with device-specific configuration profiles may be determined by administrator input, user input, and/or in any other suitable manner. For example, one device 150A may be assigned a location value 161 based on its physical presence in a particular conference room, another device 150B may be assigned a location value 163 based on its physical presence in a different room, and yet another device 150N may be assigned a location value 169 based on its physical presence in yet another room. In one embodiment, the skills that a device may be authorized to perform may be dependent upon the parameters associated with the device, such as a location parameter (e.g., a particular room in a building). In various embodiments, all or part of a device configuration may be stored remotely in the service provider environment 100 and/or in storage locally accessible to the device itself. For example, a full configuration profile may be stored by the device management service 120, while a more limited set of configuration parameters may be stored in memory at the device.

In one embodiment, the devices 150A-150N may be used to participate in teleconferences that are brokered by the service provider environment 100. In one embodiment, conferences may be implemented using a call management functionality 140 that permits devices to make phone calls, e.g., to send audio to others and receive audio from others. In one embodiment, during a phone call or teleconference using one of the devices 150A-150N, not all voice input may be analyzed by the voice input analysis 111. However, phrases that begin with a "wake word" or other known prompt may be analyzed by the voice input analysis 111 for potential action by the service provider environment 100. For example, if a user speaks a phrase such as "[wake word], join the meeting," the voice input analysis 111 may analyze the voice input and attempt to join the device to a teleconference for which the device's location is reserved at that time. As another example, if a user speaks a phrase such as "[wake word], leave the meeting," the voice input analysis 111 may analyze the voice input and attempt to terminate the participation of the device in a teleconference. In one embodiment, during a call or teleconference, utterances that are not preceded by the wake word or other predetermined prompt may be forwarded to other participants in the call or conference without being analyzed by the voice input analysis 111.

In one embodiment, conferences may be managed using a conference management functionality 130. The conference management functionality may interact with a calendar management functionality 170. The calendar management 170 may maintain location-specific calendars in which the corresponding location may be reserved for conferences for particular blocks of time. For example, the calendar management 170 may maintain one location-specific calendar 175A for location 161 and another location-specific calendar 175N for location 169. As shown in the example of FIG. 1, the calendar management may be implemented outside the service provider environment 100, e.g., using a commercially available calendar management product such as Microsoft Exchange, Microsoft Outlook, Google Calendar, and so on. However, it is contemplated that the calendar management may be implemented inside the service provider environment 100. A location-specific calendar may indicate when a particular location is reserved for a conference from a scheduled starting time to a scheduled ending time. A conference reservation may also include information such as the identity of the conference's organizer, a conference identifier, a personal identification number (PIN) or other code usable to join the conference, and so on. The conference management 130 may disallow double booking, such that the same location may not be booked for two or more conferences at the same point in time.

In one embodiment, during the window of time indicated in a conference reservation, a device monitoring functionality 131 may monitor the use or non-use of a conferencing device associated with the location of the reservation. The association between a device and a location may be determined by referring to the device-specific configurations maintained by the device management 120. In one embodiment, the device monitoring functionality 131 may refer to the usage logs maintained by the device usage logging 113. For example, the device monitoring 131 may check the usage logs for a period of time during the scheduled reservation, e.g., for a period of ten minutes from the scheduled start of the conference reservation. The duration of the monitoring period may be configurable, e.g., by the organizer of the conference when establishing the reservation. In one embodiment, the monitoring 131 may be disabled for a particular conference reservation, e.g., by the organizer of the conference when establishing the reservation. In one embodiment, the monitoring 131 may be enabled or disabled for particular devices or classes of devices based on parameter values in the device configurations 125A-125N. If, based on the device monitoring 131, a device is not used in a suitable manner to access a conference during a particular window of time (e.g., within the first few minutes of the reservation), then a reservation cancellation functionality 132 may cancel the reservation of the location for the conference and thus free the location to be used for other conferences. Canceling a reservation may include interacting with the calendar management 170 to modify the location-specific calendar associated with the location that was previously reserved. In one embodiment, the cancellation of a reservation may be performed automatically, e.g., without user input during the reserved time.

The devices 150A-150N may communicate with the interface 110 (or other components of the service provider environment 100) over one or more networks 190, e.g., by conveying network-based service requests to the service provider environment via the network(s). In one embodiment, the network(s) 190 may include one or more wireless networks, such as one or more Wi-Fi networks or other types of wireless local area networks (WLANs). The wireless network(s) may be implemented using any suitable wireless communication technologies and any suitable configuration of networking components, such as one or more wireless routers. In one embodiment, the devices 150A-150N may include a wireless networking interface for accessing Wi-Fi and/or other suitable wireless networks. In one embodiment, the network(s) 190 may include communicate via one or more wired networks, such as one or more wired networks over a transmission medium such as Ethernet. In one embodiment, the devices 150A-150N may include a wired networking interface for accessing suitable wired networks. In various embodiments, the network(s) 190 may encompass any suitable combination of networking hardware and protocols necessary to establish network-based communications between the devices 150A-150N and service provider environment 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. In one embodiment, the network(s) 190 may include the hardware (e.g., modems, routers, switches, load balancers, proxy servers, etc.) and software (e.g., protocol stacks, accounting software, firewall/security software, etc.) necessary to establish a networking link between two particular components. In one embodiments, the devices 150A-150N may be able to communicate with the service provider environment 100 using a private network rather than the public Internet. In one embodiment, the devices 150A-150N may represent a satellite device that connects to a central device over a local area network (wired or wireless) or direct connection (wired or wireless, e.g., Bluetooth), e.g., to stream voice input to the central device, and the central device may then stream the voice input to the service provider environment 100.

In one embodiment, the functionality of the various components of the service provider environment 100 may be distributed across different physical sites. For example, a first portion of the functionality of the service provider environment 100 may be implemented in one or more components that are located in the same local area network or physical site as any of the devices 150A-150N, while a second portion of the functionality of the service provider environment 100 may be implemented "in the cloud" and accessible to the first portion via a wide area network. The first portion may include enough computing resources to perform tasks such as voice input analysis 111 as well as more frequently accessed services. All or part of the device configuration may be stored locally (in the first portion), in the cloud (the second portion), or in both portions. Using this distribution of services to localize more of the processing, network usage may be minimized between a local site (including the device) and the cloud-based portion of the service provider environment 100. Such a distribution of service(s) may be especially beneficial if a device 150 is located in a remote area having restricted network access.

Figure 8:
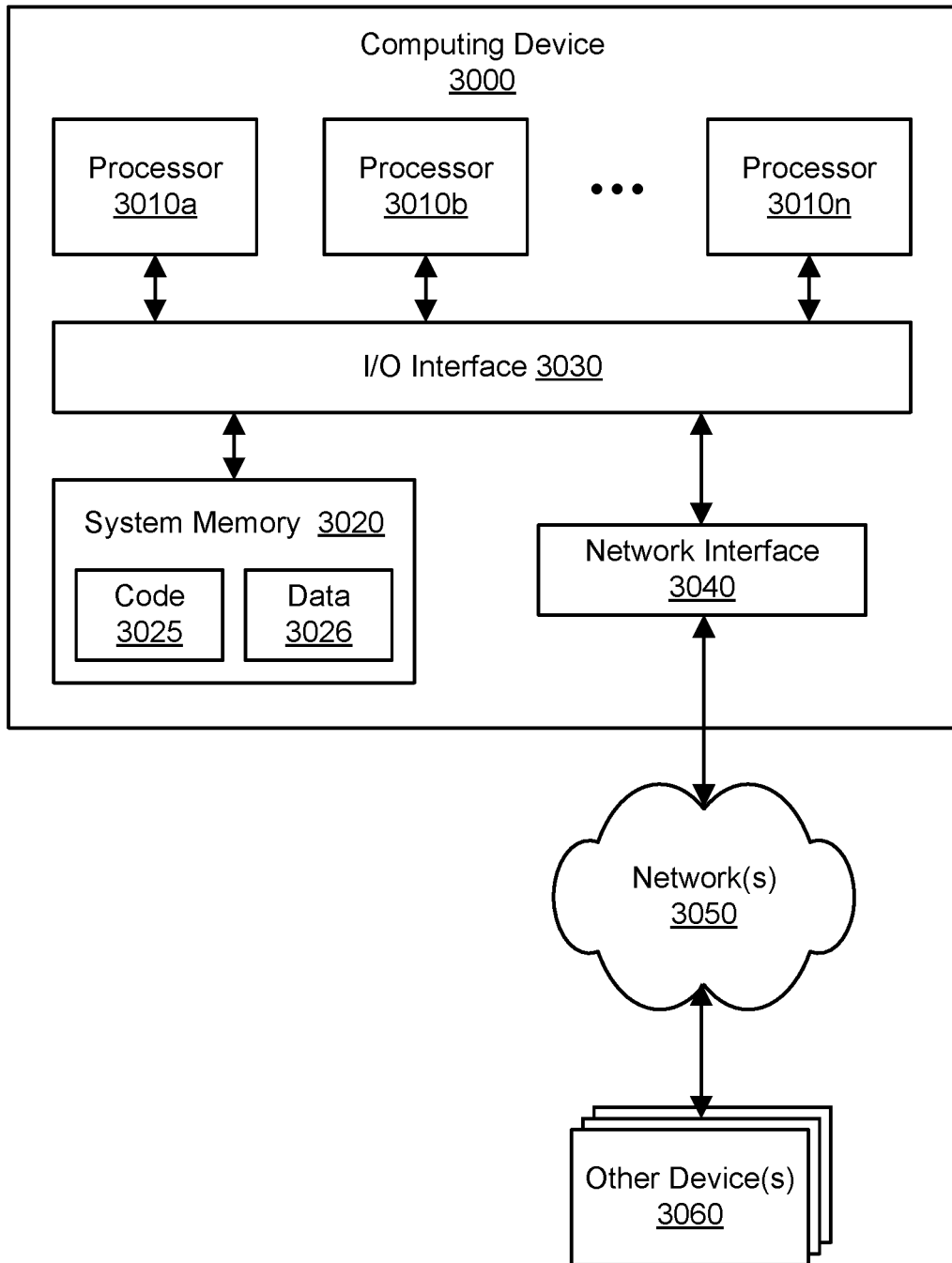
FIG. 8 illustrates an example computing device that may be used in some embodiments.

Any of the devices 150A-150N may be implemented by the example computing device 3000 illustrated in FIG. 8. The service provider environment 100 may include a plurality of computing devices, any of which may be implemented by the example computing device 3000 illustrated in FIG. 8. In various embodiments, portions of the described functionality of the service provider environment 100 may be provided by the same computing device or by any suitable number of different computing devices. If any of the components of the service provider environment 100 are implemented using different computing devices, then the components and their respective computing devices may be communicatively coupled, e.g., via one or more networks. Each of the illustrated components may represent any combination of software and hardware usable to perform their respective functions. It is contemplated that the devices 150A-150N, service provider environment 100, calendar management 170, and networking infrastructure 190 may include additional components not shown, fewer components than shown, or different combinations, configurations, or quantities of the components shown.

Figure 2:
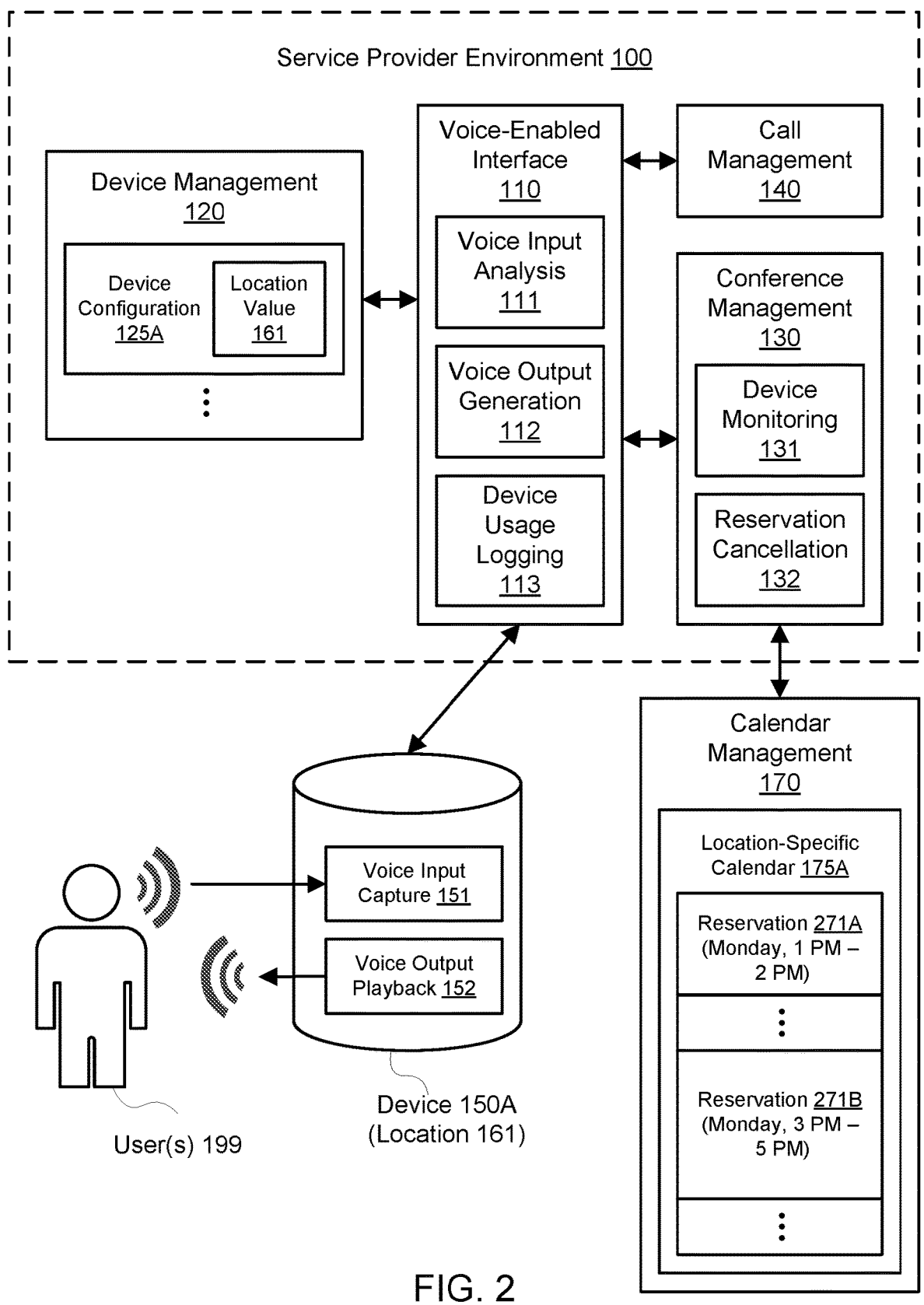
FIG. 2 illustrates further aspects of the example system environment for device monitoring for conference reservation cancellation, including a conferencing device that can be used to join scheduled conferences for which the device's location has been reserved, according to one embodiment.

FIG. 2 illustrates further aspects of the example system environment for device monitoring for conference reservation cancellation, including a conferencing device that can be used to join scheduled conferences for which the device's location has been reserved, according to one embodiment. Using a voice input capture component 151 such as one or more microphones, a particular conferencing device 150A (located in a particular location 161, as indicated by the device-specific configuration 125A) may be configured to capture voice input and send the voice input to the service provider environment 100 via the network(s) 190. In one embodiment, the voice input may represent speech input from one or more users 199. The speech may include natural language speech. The voice input may represent digital audio in any suitable format. The voice input may be streamed or otherwise sent from the device 150A to the interface 110. Using the voice input analysis 111, the service provider environment 100 may decode the voice input to determine one or more terms, phrases, or other utterances that are present in the audio. In one embodiment, one or more of the terms may represent commands to invoke functions (e.g., skills) provided by the service provider environment 100. In one embodiment, one or more of the terms may represent data usable by functions (e.g., skills) provided by the service provider environment 100. In one embodiment, the same voice input may include both an invocation of a skill (or other function) and also arguments or other data usable by that skill or function.

In one embodiment, the voice input capture 151 at a conferencing device 150A may be prompted by detection of an audible "wake word" associated with the device, e.g., using the voice input capture to monitor audio in the vicinity of the device while the device is powered on and appropriately configured. In one embodiment, the voice input capture 151 may be prompted by a button press, a gesture, or another suitable user interaction instead of a wake word. In one embodiment, after the wake word or other user-supplied prompt is detected, the voice input capture 151 may continue to record (and the device may continue to stream) audio input until a pause of suitable duration is detected; until the voice-enabled interface 110 instructs the device to stop; until a particular duration has been reached for the captured audio; or until a button press, gesture, or other suitable user interaction is received to end the voice capture.

In one embodiment, the device 150A may include or have access to a voice output playback functionality 152, including a speaker and/or other suitable audio-generating component(s), usable to play back audio output including computer-generated speech. In various embodiments, the voice output playback 152 may be located on board the device 150A or instead located in another device, such as a remote control. The voice-enabled interface 110 may also include a component (or multiple components) for voice output generation 112. Using the voice output generation 112, the service provider environment 100 may generate audio output representing computer-generated speech. The service provider environment 100 may stream or otherwise send the voice output to the device 150A, and the device may play back the output for user(s) 199 using the voice output playback 152. In various embodiments, the voice output may represent an acknowledgement of some aspect of the voice input (e.g., acknowledgement that the requested task was performed successfully), a response to a question or inquiry posed by the user(s) 199, a request for more information from the user, or any other suitable audio-based interaction. In one embodiment, the service provider environment 100 may send voice output to the device 150A that is part of a conference, such that the voice output is generated by other participants in the conference and is played back on the device 150A.

The device 150A may be associated with a location 161 in which the device is installed or to which the device has been deployed. The location 161 may be associated with a location-specific calendar 175A maintained by the calendar management 170. The calendar 175A may include any suitable number of reservations over any suitable number of days, weeks, months, or years. As shown in the example of FIG. 2, the calendar 175A may store a reservation 271A of the location 161 for a block of time from 1 PM to 2 PM on the next occurring Monday. As also shown in the example of FIG. 2, the calendar 175A may store another reservation 271B of the location 161 for another block of time from 3 PM to 5 PM, also on the next occurring Monday. In one embodiment, the reservations 271A and 271B may be submitted to the calendar management 170 by respective organizers of the conferences. In one embodiment, the device monitoring 131 (and potential reservation cancellation based thereon) may be enabled or disabled by an organizer for the reservation 271A or 271B. In one embodiment, the device monitoring 131 (and potential reservation cancellation based thereon) may be enabled or disabled automatically based on attributes of the device configuration 125A for the device 150A associated with the location 161. In one embodiment, one or more of the reservations 271A or 271B may represent recurring reservations, e.g., that are repeated every Monday at the same time.

Figure 3:
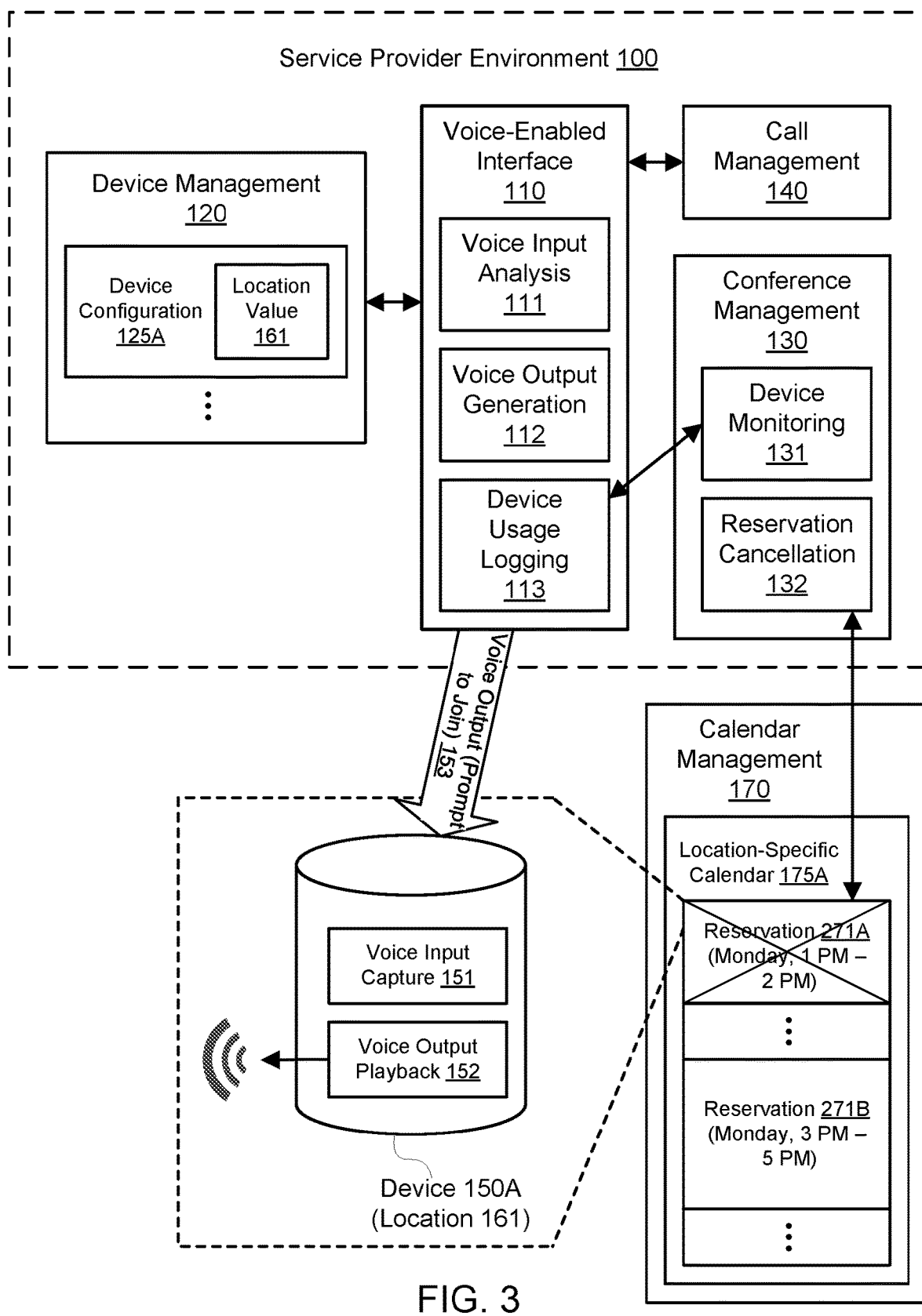
FIG. 3 illustrates further aspects of the example system environment for device monitoring for conference reservation cancellation, including monitoring a usage log for a device associated with a particular location during a scheduled meeting time, according to one embodiment.

FIG. 3 illustrates further aspects of the example system environment for device monitoring for conference reservation cancellation, including monitoring a usage log for a device associated with a particular location during a scheduled meeting time, according to one embodiment. FIG. 3 may represent a continuation of the example shown in FIG. 2, in which the starting time of the reservation 271A has arrived. For a period of time within the scheduled reservation 271A, the device monitoring 131 may determine whether the device 150A has joined the conference or otherwise submitted audio input associated with the conference. For example, use or non-use of the device 150A may be monitored for the first ten minutes of the reservation. As discussed above, the duration of the monitoring period may vary, e.g., based on input from the conference organizer. The device usage log maintained by the device usage logging 113 may be used to determine whether suitable or qualifying user input has been provided using the device at any point during the monitoring period. In one embodiment, suitable or qualifying input may include voice input such as "[wake word], join the meeting," "[wake word], add me to the conference," "[wake word], let's join conference [ID number]," and so on, potentially based on detection of keywords such as "join" and "meeting." In on embodiment, suitable input may include any recognizably human speech in the vicinity of the device 150A as evidence that the location is presently occupied. In the example shown in FIG. 3, no such qualifying voice input may be received during the monitoring period.

In one embodiment, the reservation cancellation 132 may be performed based (at least in part) on the absence of suitable or qualifying user input associated with the conference from the device 150A. For example, the reservation 271A may be canceled in the calendar 175A if no voice input associated with the conference is detected by the end of the monitoring period. However, the conference management 130 may take further steps to confirm whether or not the reservation should be canceled. In one embodiment, the conference management 130 may interact with the voice-enabled interface 110 to send voice output 153 to the device 150A for playback on the device. The voice output 153 may represent a prompt or solicitation for a user to supply voice input representing a desire to join the scheduled conference. For example, the voice output 153 may state "would you like to join the meeting? or "would you like to join the meeting organized by [identity of organizer] at [scheduled starting time]?" In one embodiment, if suitable voice input (e.g., "yes") is received within a threshold period of time after the voice output 153 is played back (as determined using the voice input analysis 111), then the conference management 130 may add the device to the scheduled conference. In one embodiment, if suitable voice input (e.g., "yes") is not received within a threshold period of time after the voice output 153 is played back, then the conference management 130 may cancel the reservation 271A and thus free the location to be scheduled for another conference during the remaining time associated with the canceled reservation. As another example, the service provider environment may place a phone call to the device 150A, and if the phone call is not picked up or accepted, the reservation 271A may be canceled automatically. As shown in the example of FIG. 3, the reservation 271A may be canceled in the calendar 175A based on an absence of suitable user input from the device 150A during a period of time between the scheduled starting time and the scheduled ending time of the reservation. In the illustrated example, the device 150A may be monitored for a period of time at the start of the reservation and before the device 150A has joined the conference. However, it is contemplated that the same type of monitoring 131 may be used to cancel a reservation after the device 150A has actually participated in a conference but terminated its participation before the scheduled end of the conference.

Figure 4:
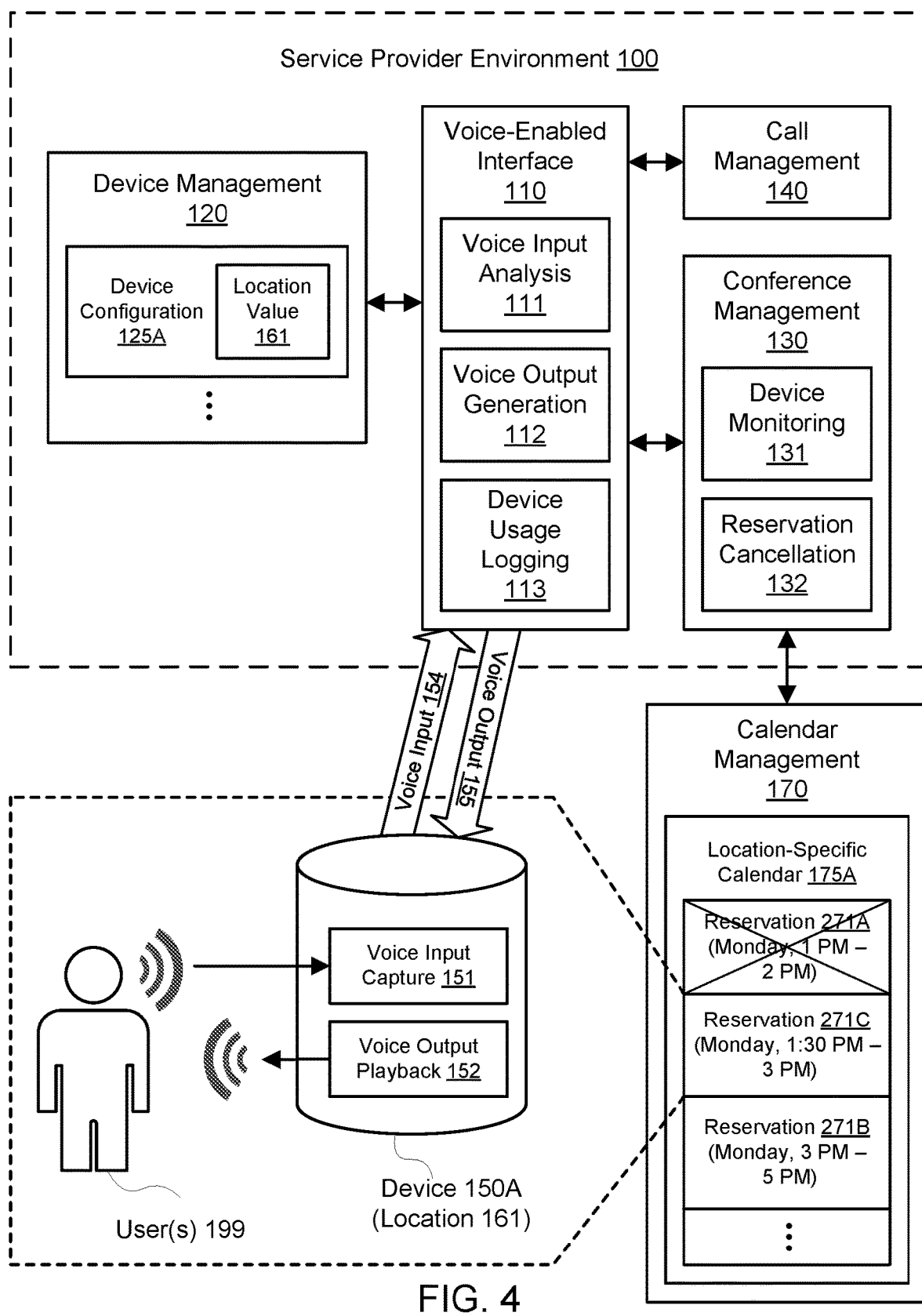
FIG. 4 illustrates further aspects of the example system environment for device monitoring for conference reservation cancellation, including reserving the location for another conference that begins during the scheduled meeting time for the canceled reservation, according to one embodiment.

FIG. 4 illustrates further aspects of the example system environment for device monitoring for conference reservation cancellation, including reserving the location for another conference that begins during the scheduled meeting time for the canceled reservation, according to one embodiment. FIG. 4 may represent a continuation of the example shown in FIG. 3, in which the reservation 271A has been canceled before the ending time of the conference has arrived. For example, the reservation 271A may have been canceled approximately ten minutes past the starting time, in the absence of any suitable voice input associated with the conference from the device 150A. As shown in the example of FIG. 4, an additional conference may be scheduled for the location 161 (and its associated device 150A) that is scheduled to begin during the window of time associated with the canceled conference. For example, if the canceled conference was scheduled between 1 PM and 2 PM but is canceled before 1:30 PM, the new reservation 271C may start at 1:30 PM and continue to 3 PM, beyond which time the location is reserved for another conference. In one embodiment, the new reservation 271C may be subject to the same device monitoring 131 as the canceled reservation 271A. In the illustrated example, however, one or more users 199 may properly use the device 150A to participate in the conference 271C during its scheduled time. Participation in the conference may include the device sending voice input 154 captured from the user(s) 199 to the service provider environment 100, where the voice input 154 may be provided to other participants in the conference, and the device receiving voice output 155 for playback on the device, where the voice output 155 is provided by other participants in the conference via the service provider environment 100. Using the techniques described herein, conference rooms or other locations that have been reserved but not actually used for conferences may be freed for other conferences.

Figure 5:
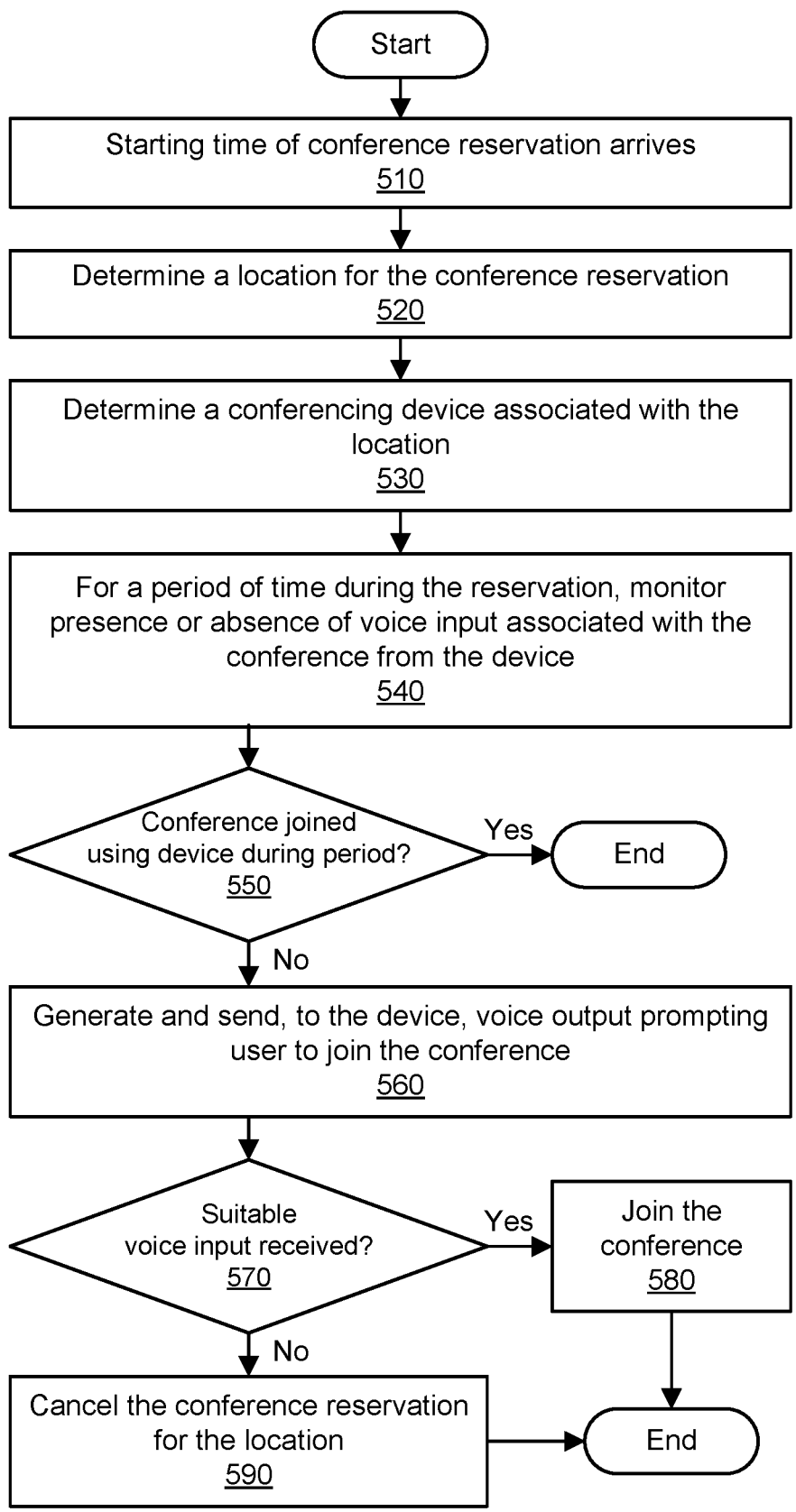
FIG. 5 is a flowchart illustrating a method for device monitoring for conference reservation cancellation, according to one embodiment.

FIG. 5 is a flowchart illustrating a method for device monitoring for conference reservation cancellation, according to one embodiment. As shown in 510, a reservation of a conference or meeting may begin at a scheduled starting time, and that starting time may arrive. The conference may be scheduled between a starting time and an ending time, e.g., from 1 PM to 2 PM. The conference reservation may be set up by an organizer. In one embodiment, for a particular conference reservation, the organizer may enable the functionality of device monitoring for conference reservation cancellation, e.g., by selecting an option to enable when setting up the conference. In one embodiment, the functionality of device monitoring for conference reservation cancellation may be enabled by default and may be disabled by a conference organizer e.g., by selecting an option to disable when setting up the conference.

As shown in 520, a location value may be determined for the conference reservation. The location value may represent an identifier of a conference room, such as a room name or room number. In one embodiment, the location value may be reserved for the conference using a calendar. The calendar may be referenced to determine the location value. The calendar may represent a location-specific calendar that is associated with reservations for a particular conference room or other location. In one embodiment, if multiple locations are reserved for the conference, then the conference may be included in multiple location-specific calendars. In one embodiment, the calendar(s) may be maintained using a calendar service that is external to the service provider environment that implements the conference management. In one embodiment, the calendar(s) may be maintained using a calendar service that is internal to the service provider environment that implements the conference management. For a particular conference reservation for a particular location, the calendar may store data such the scheduled starting time, the scheduled ending time, the identity of the organizer, a personal identification number (PIN) or other code usable to access the conference, and/or other relevant values.

As shown in 530, a device associated with the location value of the conference may be determined. The location value may be associated with the device in a device-specific configuration that is maintained in the service provider environment, and the configuration may be referenced to determine the association between the device and the location. In one embodiment, the device may be assigned to the location by an administrator or any user with suitable privileges. The device may represent a voice-capturing device such as a smart speaker or conferencing device that is present in the conference room identified by the location value. The device may include an audio capture component such as one or more microphones and an audio playback component such as one or more speakers. The device may be configured to stream or otherwise send captured audio to a service provider environment and to receive and play back audio provided by the service provider environment. The device may be used to participate in conferences. The service provider environment may be implemented in the cloud, and the device may interact with the service provider environment over a network. Within the service provider environment, a voice-enabled service may perform analysis of audio from the device and may then invoke one or more voice-enabled functionalities (referred to as skills) based on the analysis. For example, if voice input such as "join the meeting" is received from a device, a voice input analysis component of the service provider environment may analyze the input (e.g., by performing speech-to-text), determine that a conferencing skill has been invoked, and then invoke the conferencing skill to permit the user of the device to participate in a conference.

As shown in 540, any voice input from the device may be monitored within a period of time occurring between the scheduled starting time and the scheduled ending time of the conference. In one embodiment, the presence or absence of voice input may be monitored for a particular period of time to determine whether to maintain or cancel the reservation of the location for the conference. In one embodiment, the duration of the monitoring period may be configured by the organizer of the conference, e.g., when setting up the conference. For example, voice input (if any) from the device may be monitored for the first ten minutes from the scheduled start of the conference. However, the voice input may be monitored for potential conference reservation cancellation at any suitable time between the scheduled start and scheduled end of the conference, including a period of time after the device is actually used to participate in the conference. In one embodiment, voice input to the device may be logged in the service provider environment, e.g., based on voice input analysis that determines words and phrases (utterances) present in the voice input. For a particular device, the usage log may include the contents and timestamps of interactions between the device and the service provider environment. For example, if the device captures and sends voice input such as "join the meeting" at 1:05 PM, then the log may reflect the phrase "join the meeting" and the timestamp of 1:05 PM. The usage log may be analyzed to determine whether the device has been used to receive voice input associated with the scheduled conference during a particular period of time.

As shown in 550, it may be determined whether the device has joined the conference during the period of time. In one embodiment, the operation shown in 550 may determine whether voice input associated with the scheduled conference has been received from the device within the monitoring period. For example, suitable voice input associated with the conference may represent a user verbally expressing a desire to join the conference (e.g., "join the meeting"). During the monitoring period, however, no voice input may be received from the device, or voice input not related to the scheduled conference may be received (e.g., a user says "turn off the lights"). In one embodiment, if suitable voice input associated in the conference is received during the monitoring period, then no further actions may be taken; the reservation of the location for the conference may be maintained.

However, if suitable voice input associated in the conference is not received during the monitoring period, then one or more further actions may be taken. As shown in 560, voice output may be generated that represents a solicitation or prompt of voice input to join the conference. For example, the voice output may state "would you like to join the meeting?" The voice output may be generated and sent to the device for playback by a voice output functionality of the service provider environment. The voice output may be accompanied by, for example, visual output (e.g., a flashing light). As shown in 570, it may be determined whether the voice input joining the conference is received from the device within some suitable period of time (e.g., a few seconds) after the voice output is played on the device. If so, then as shown in 580, the device may join the conference, such that audio input from the device may be sent to other conference participants and audio from the other participants may be played on the device. If not, then as shown in 590, the reservation of the location for the conference may be canceled. Canceling the reservation may include modifying the location-specific calendar to indicate that the location is free for the remainder of the cancelled conference. In one embodiment, the operations shown in 560 through 590 may be skipped, and the reservation may be canceled as shown in 590 without soliciting voice input or otherwise attempting to verify the cancellation based on additional user input.

Figure 6:
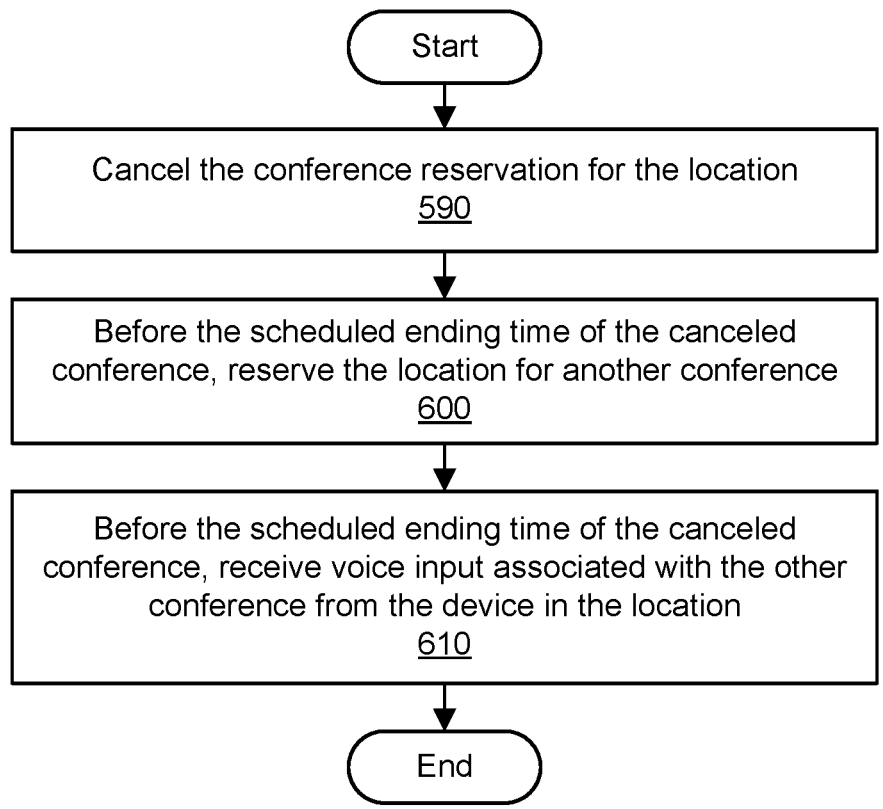
FIG. 6 is a flowchart illustrating further aspects of the method for device monitoring for conference reservation cancellation, including reserving the location for another conference that begins during the scheduled meeting time for the canceled reservation, according to one embodiment.

FIG. 6 is a flowchart illustrating further aspects of the method for device monitoring for conference reservation cancellation, including reserving the location for another conference that begins during the scheduled meeting time for the canceled reservation, according to one embodiment. The operations shown in FIG. 6 may be performed after the operations shown in FIG. 5 result in cancellation of the reservation of a particular location for a particular conference. As shown in 590, the reservation of the location for the conference may be canceled. As discussed above, the canceled conference was scheduled to occur between a starting time and an ending time. As shown in 600, before the ending time of the canceled conference, the location may be reserved for another conference. The location may be reserved for the new conference using the conference management of the service provider environment and/or a location-specific calendar maintained by a calendar service. As shown in 610, before the ending time of the canceled conference, voice input associated with the new conference may be received by the service provider environment from the device in the reserved location. For example, the voice input associated with the new conference may represent an utterance representing a desire to join the new conference. If such voice input is not received during some period of time within the scheduled time of the new conference, then one or more of the operations shown in FIG. 5 may be performed with respect to the new conference to confirm or cancel the reservation.

Figure 7:
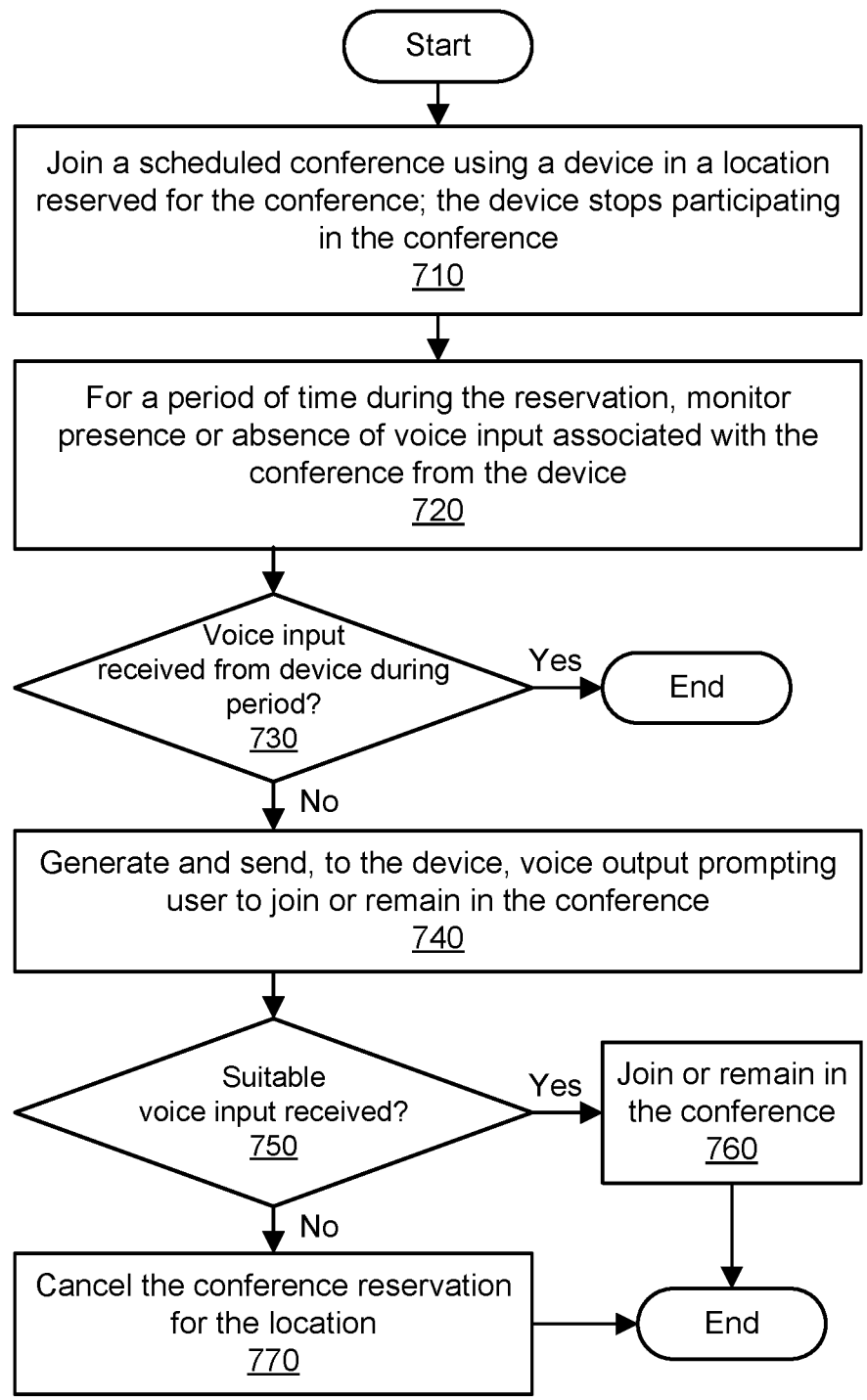
FIG. 7 is a flowchart illustrating further aspects of the method for device monitoring for conference reservation cancellation, including canceling a conference reservation after a conference ends prematurely, according to one embodiment.

FIG. 7 is a flowchart illustrating further aspects of the method for device monitoring for conference reservation cancellation, including canceling a conference reservation after a conference ends prematurely, according to one embodiment. As shown in 710, a device may be used to join a scheduled conference. The conference may be associated with a conference reservation, and the reservation may include a starting time and an ending time, e.g., from 1 PM to 2 PM. The device may join the conference using suitable voice input from a user, such as "join the meeting" or "join [meeting identifier]." When such voice input is received at the service provider environment, the location of the device may be determined. The location value may represent an identifier of a conference room, such as a room name or room number. In one embodiment, the location value may be reserved for the conference using a calendar. The calendar may be referenced to determine the location value. The calendar may represent a location-specific calendar that is associated with reservations for a particular conference room or other location. In one embodiment, if multiple locations are reserved for the conference, then the conference may be included in multiple location-specific calendars. In one embodiment, the calendar(s) may be maintained using a calendar service that is external to the service provider environment that implements the conference management. In one embodiment, the calendar(s) may be maintained using a calendar service that is internal to the service provider environment that implements the conference management. For a particular conference reservation for a particular location, the calendar may store data such the scheduled starting time, the scheduled ending time, the identity of the organizer, a personal identification number (PIN) or other code usable to access the conference, and/or other relevant values.

The location value may be associated with the device in a device-specific configuration that is maintained in the service provider environment, and the configuration may be referenced to determine the association between the device and the location. In one embodiment, the device may be assigned to the location by an administrator or any user with suitable privileges. The device may represent a voice-capturing device such as a smart speaker or conferencing device that is present in the conference room identified by the location value. The device may include an audio capture component such as one or more microphones and an audio playback component such as one or more speakers. The device may be configured to stream or otherwise send captured audio to a service provider environment and to receive and play back audio provided by the service provider environment. The device may be used to participate in conferences. The service provider environment may be implemented in the cloud, and the device may interact with the service provider environment over a network. Within the service provider environment, a voice-enabled service may perform analysis of audio from the device and may then invoke one or more voice-enabled functionalities (referred to as skills) based on the analysis. For example, if voice input such as "join the meeting" is received from a device, a voice input analysis component of the service provider environment may analyze the input (e.g., by performing speech-to-text), determine that a conferencing skill has been invoked, and then invoke the conferencing skill to permit the user of the device to participate in a conference.

While the device is used by one or more users to participate in the scheduled conference, audio associated with the conference may be received from the device by the service provider environment. A call management functionality of the service provider environment may send the conference audio to one or more conference participants. The call management functionality may also send audio from the other participants to the particular device for playback. At some point during the scheduled reservation, the device may cease to participate in the conference. For example, a user of the device may verbally express a desire to leave the conference. As another example, audio associated with the conference may cease to be received from the device by the service provider environment before the ending time of the conference reservation. Accordingly, as shown in 720, any voice input from the device may be monitored within a period of time occurring between the scheduled starting time and the scheduled ending time of the conference. In one embodiment, the presence or absence of voice input may be monitored for a particular period of time to determine whether to maintain or cancel the reservation of the location for the conference. For example, voice input (if any) from the device may be monitored even after the device has joined the conference. In one embodiment, voice input to the device may be logged in the service provider environment, e.g., based on voice input analysis that determines words and phrases (utterances) present in the voice input. For a particular device, the usage log may include the contents and timestamps of interactions between the device and the service provider environment. The usage log may be analyzed to determine whether the device has been used to receive voice input associated with the scheduled conference during a particular period of time.

As shown in 730, it may be determined whether voice input associated with the scheduled conference has been received from the device within the monitoring period. During the monitoring period, however, no voice input may be received from the device, or voice input not related to the scheduled conference may be received. In one embodiment, if suitable voice input associated in the conference is received during the monitoring period, then no further actions may be taken; the reservation of the location for the conference may be maintained.

However, if suitable voice input associated in the conference is not received during the monitoring period, then one or more further actions may be taken. As shown in 740, voice output may be generated that represents a solicitation of voice input to stay in the conference. For example, the voice output may state "would you like to stay in the meeting?" The voice output may be generated and sent to the device for playback by a voice output functionality of the service provider environment. As shown in 750, it may be determined whether the voice input to stay in the conference is received from the device within some suitable period of time (e.g., a few seconds) after the voice output is played on the device. If so, then as shown in 760, the device may stay in the conference, and the reservation of the location may be maintained. If not, then as shown in 770, the reservation of the location for the conference may be canceled. Canceling the reservation may include modifying the location-specific calendar to indicate that the location is free for the remainder of the cancelled conference.

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices implementing one or more services in a service provider environment; and
   a voice-capturing device, wherein the voice-capturing device is associated with a conference room in a device configuration maintained by the one or more services, and wherein the voice-capturing device sends voice input to the one or more services over a network; and
   wherein the one or more services are executable by the one or more computing devices to:
      determine that the conference room is associated with a reservation for a scheduled conference associated with a scheduled starting time and a scheduled ending time;
      monitor a presence or absence of voice input from the voice-capturing device within a period of time occurring between the scheduled starting time and the scheduled ending time;
      cancel the reservation based on determining that voice input representing one or more users joining the scheduled conference is not received from the voice-capturing device within the period of time occurring between the scheduled starting time and the scheduled ending time;
      associate the conference room with an additional reservation for an additional scheduled conference, wherein the additional scheduled conference is scheduled to begin prior to the scheduled ending time for the conference; and
      receive, from the voice-capturing device, voice input associated with the additional scheduled conference.

2. The system as recited in claim 1, wherein the one or more services are further executable by the one or more computing devices to:
   generate voice output based on determining that the voice input representing one or more users joining the scheduled conference is not received from the voice-capturing device within the period of time, wherein the voice output is played through the voice-capturing device and represents a prompt for voice input to join the scheduled conference.

3. The system as recited in claim 1, wherein a duration of the period of time is determined based on input from an organizer of the scheduled conference.

4. The system as recited in claim 1, wherein the one or more services are further executable by the one or more computing devices to:
   determine, using voice input analysis in the service provider environment, that voice input received from the voice-capturing device during the period of time is not associated with the scheduled conference.

5. A computer-implemented method, comprising:
   determining that a location value is associated with a reservation for a scheduled conference associated with a scheduled starting time and a scheduled ending time, wherein a device is associated with the location value, and wherein the device is configured to send voice input to a service provider environment over a network;
   determining that voice input associated with the scheduled conference is not received from the device within a period of time occurring between the scheduled starting time and the scheduled ending time; and
   canceling the reservation based on determining that the voice input associated with the scheduled conference is not received from the device within the period of time occurring between the scheduled starting time and the scheduled ending time.

6. The method as recited in claim 5, further comprising:
   associating the location value with an additional reservation for an additional scheduled conference, wherein the additional scheduled conference is scheduled to begin prior to the scheduled ending time for the conference; and
   receiving, from the device, voice input associated with the additional scheduled conference.

7. The method as recited in claim 5, further comprising:
   generating voice output based on determining that the voice input associated with the scheduled conference is not received from the device within the period of time, wherein the voice output is played through the device and represents a prompt for voice input associated with the scheduled conference.

8. The method as recited in claim 5, wherein the device is associated with the location value in a device configuration maintained by one or more services in the service provider environment, and wherein the location value identifies a conference room.

9. The method as recited in claim 5, wherein a duration of the period of time is determined based on input from an organizer of the scheduled conference.

10. The method as recited in claim 5, further comprising:
   determining, using voice input analysis in the service provider environment, that voice input received from the device during the period of time is not associated with the scheduled conference.

11. The method as recited in claim 5, wherein the reservation is scheduled on a location-specific calendar maintained by a calendar service.

12. The method as recited in claim 5, wherein the period of time follows a use of the device to participate in the scheduled conference.

13. A non-transitory, computer-readable storage medium storing program instructions computer-executable to perform:
   determining that a location value is associated with a reservation for a scheduled conference associated with a scheduled starting time and a scheduled ending time, wherein a voice-capturing device is associated with the location value, and wherein the voice-capturing device is configured to send voice input to a service provider environment over a network;
   determining that voice input associated with the scheduled conference is not received from the voice-capturing device within a period of time between the scheduled starting time and the scheduled ending time;
   canceling the reservation based on determining that the voice input associated with the scheduled conference is not received from the voice-capturing device within the period of time between the scheduled starting time and the scheduled ending time; and
   associating the location value with an additional reservation for an additional scheduled conference, wherein the additional scheduled conference is scheduled to begin prior to the scheduled ending time for the conference.

14. The non-transitory, computer-readable storage medium as recited in claim 13, wherein the program instructions are further computer-executable to perform:
   receiving, from the voice-capturing device, voice input associated with the additional scheduled conference.

15. The non-transitory, computer-readable storage medium as recited in claim 13, wherein the program instructions are further computer-executable to perform:
   generating voice output based on determining that the voice input associated with the scheduled conference is not received from the voice-capturing device within the period of time, wherein the voice output is played through the voice-capturing device and represents a prompt for voice input associated with the scheduled conference.

16. The non-transitory, computer-readable storage medium as recited in claim 13, wherein the voice-capturing device is associated with the location value in a device configuration maintained by one or more services in the service provider environment, and wherein the location value identifies a conference room.

17. The non-transitory, computer-readable storage medium as recited in claim 13, wherein a duration of the period of time is determined based on input from an organizer of the scheduled conference.

18. The non-transitory, computer-readable storage medium as recited in claim 13, wherein the program instructions are further computer-executable to perform:
   determining, using voice input analysis in the service provider environment, that voice input received from the voice-capturing device during the period of time is not associated with the scheduled conference.

19. The non-transitory, computer-readable storage medium as recited in claim 13, wherein the reservation is scheduled on a location-specific calendar maintained by a calendar service.

20. The non-transitory, computer-readable storage medium as recited in claim 13, wherein the period of time follows a use of the device to participate in the scheduled conference.

\* \* \* \* \*